United States Patent

Germain-Lacour et al.

[11] Patent Number: 4,716,742
[45] Date of Patent: Jan. 5, 1988

[54] CRYOGENIC SYSTEM FOR RADIATION DETECTORS

[75] Inventors: Michel M. E. Germain-Lacour, Fontaine Le Comte; Joseph M. A. Loiseau, Saint Maurice, both of France

[73] Assignee: SAT (Societe Anonyme de Telecommunications), Paris, France

[21] Appl. No.: 780,340

[22] Filed: Sep. 26, 1985

[30] Foreign Application Priority Data

Oct. 2, 1984 [FR] France ................. 84 15085

[51] Int. Cl.⁴ .................................. F25B 19/00
[52] U.S. Cl. ......................... 62/514 R; 250/352
[58] Field of Search ................. 62/514 R; 250/352

[56] References Cited

U.S. PATENT DOCUMENTS

| | | | |
|---|---|---|---|
| 3,170,306 | 2/1965 | Gross, Jr. et al. | 62/514 R |
| 3,258,602 | 6/1968 | Promish | 62/514 R |
| 3,306,058 | 2/1967 | Keilin | 62/45 |
| 3,356,846 | 5/1967 | Rupert et al. | 250/352 |
| 3,593,537 | 7/1971 | Stuart et al. | 62/514 R |
| 3,970,851 | 7/1976 | Jordan | 250/353 |
| 4,487,037 | 12/1984 | Meignin et al. | 62/514 R |

FOREIGN PATENT DOCUMENTS 1529857 6/1968 France .

Primary Examiner—Ronald C. Capossela

[57] ABSTRACT

A cryogenic device for radiation detectors is provided comprising an enclosure situated between a cryogenic cold finger supporting a detector and an external wall. After a brief degasification under vacuum of said enclosure, at least one gas is therein introduced, whose liquefaction or solidification temperature is higher than the temperature reached by said cold finger.

3 Claims, 4 Drawing Figures

# CRYOGENIC SYSTEM FOR RADIATION DETECTORS

BACKGROUND OF THE INVENTION

1. Field of the Invention

The present invention relates to a cryogenic system for radiation detector comprising:

a finger cooled to a low temperature and adapted for supporting and cooling said detector, a wall surrounding said finger having, opposite said detector, a window transparent to the radiation to be detected and in which the enclosure defined by said finger and said wall is closed and filled with at least a gas.

2. Description of the Prior Art

The present invention applies to all sorts of radiation detectors having to operate at very low temperatures, in particular infra red radiation detectors.

A cryogenic system of the above type is already known and described in patent FR-A-1 529 857. In this device, the gas filling the enclosure, as well as its pressure, are chosen so that its liquefaction temperature is smaller than that reached by the cooling finger.

Compared with conventional systems, in which the thermal insulation is provided by evacuating the enclosure defined by the finger and the wall, the present system has the main advantage of not requiring a fastidious pumping operation whenever the detector is to be changed.

To provide a certain thermal insulation, the wall defining the enclosure is a double wall under a sealed vacuum, which increases the cost of the apparatus and, despite this precaution, taking into account the fact that the thermal conductivity of the gas filling the enclosure is not zero, the time of self-supporting operation of the system, that is the time during which the temperature of the detector remains less than a certain value, for a given cooling time, is less than that of a conventional vacuum system of the same dimension.

The present invention overcomes these drawbacks.

SUMMARY OF THE INVENTION

To this end, it provides a cryogenic system of the above defined type in which said gas, as well as its pressure in the enclosure, are chosen so that said gas has low thermal conductivity and so that its liquefaction or solidification temperature is greater than the temperature reached by said finger.

In the device of the invention, the latent vaporization or sublimation heat of the filling gas considerably increase its time of self-supporting operation.

Moreover, since the double wall under sealed vacuum is no longer necessary, the cost of the apparatus is considerably reduced and its reliability increased.

Advantageously, said gas is chosen from the following: xenon, krypton, argon, nitrogen, carbon dioxide, nitrogen protoxide and a mixture of these gases.

These gases, transparent to the wavelength of the radiation to be detected, are in fact inert under the conditions of use of the radiation detectors.

Again advantageously, the refrigerating fluid used for cooling said finger is recovered at the output of said finger for application in a jacket surrounding said wall.

The time of self-supporting operation of the device is further increased because of the reduction of the external temperature of the wall.

BRIEF DESCRIPTION OF THE DRAWINGS

The invention will be better understood from the following description of the preferred embodiment of the cryogenic system of the invention, with reference to the accompanying drawings in which.

DESCRIPTION OF THE PREFERRED EMBODIMENT

Figure 1:
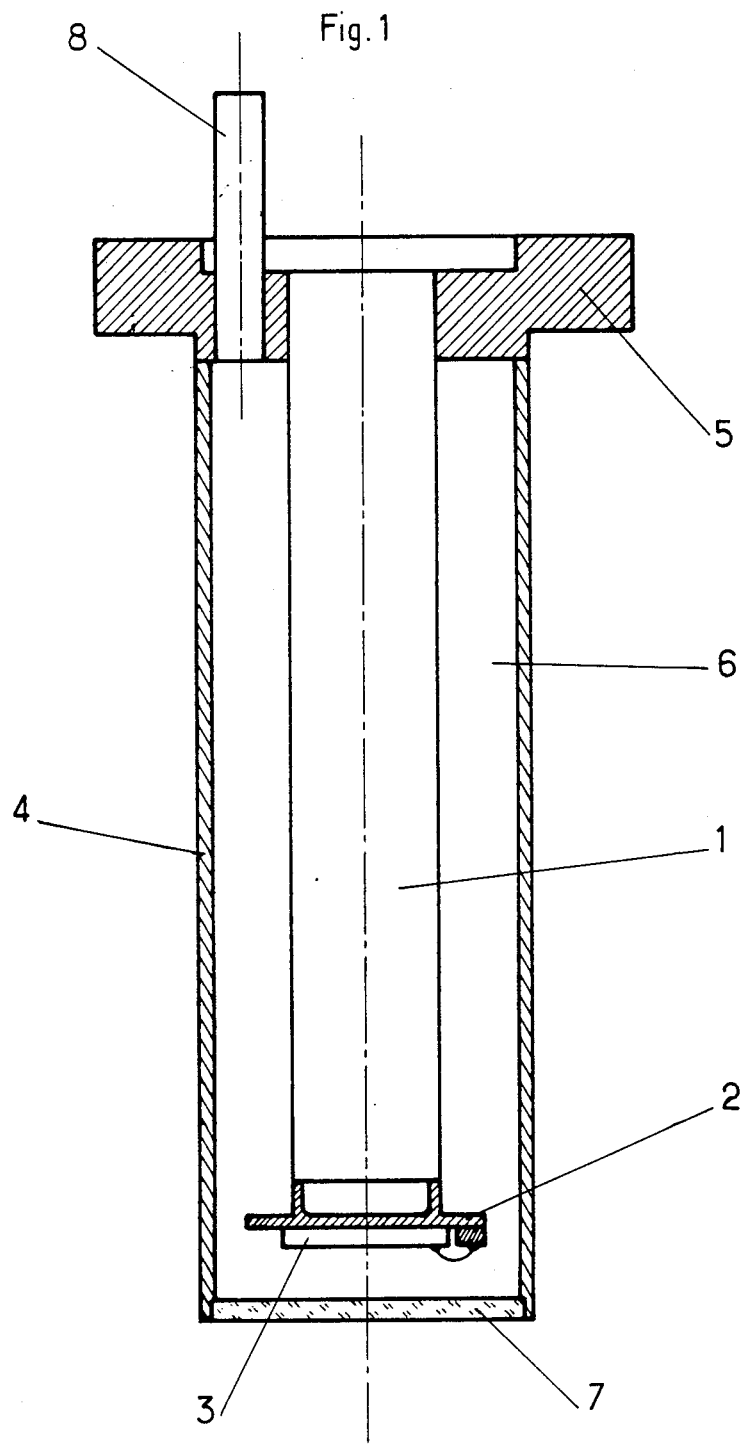
FIG. 1 shows a cryogenic system according to the invention.

As shown in FIG. 1, a radiation detector, here a photodetector 3 is supported by the end piece 2 of a finger 1 surrounded by a wall 4 forming a sealed and closed enclosure 6 with this finger. Wall 4 is provided with a window 7 facing the detector 3 so as to let the radiation to be detected pass.

After the photodetector 3 has been mounted, brief degasification of the enclosure surrounding finger 1 is carried out in the interwall enclosure 6 through a nipple 8, then a low thermal conductivity gas under a suitable pressure is introduced into this space 6.

The refrigerant supply for finger 1, of a known type and here a Joule-Thomson detent system, is then started up so as to lower the temperature of the cold finger to the value T1, the nominal operating temperature of the photodetector 3, here equal to the liquefaction temperature of the refrigerating fluid contained inside finger 1.

Figure 2:
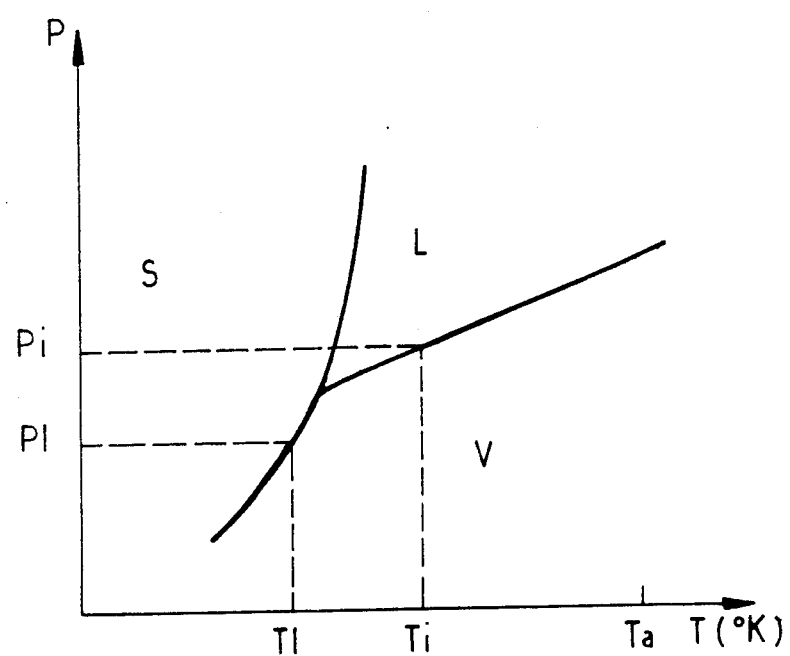
FIG. 2 shows a conventional thermo-dynamic diagram concerning the changes between the solid S, liquid L and vapor V phases of a pure substance, as a function of its temperature T and its pressure P.

FIG. 2 shows the phase change diagram of the gas filling enclosure 6, whose volume is constant. Temperature T1 corresponds here to a balance of the solid-vapor phases, the saturating vapor pressure being established at the corresponding balance pressure P1. In FIG. 2 the temperature Ti is also shown which corresponds to the upper limit temperature above which it is considered that the photodetector 3 has unsatisfactory operation. Here, the temperature Ti corresponds to a balance of the liquid-vapor phases of the gas filling enclosure 6 and the corresponding saturating vapor pressure is Pi.

Thus, during cooling of finger 1, the gas filling enclosure 6 condenses, then solidifies, partially, to reach the solid-vapor balance at the final temperature T1.

Figure 3:
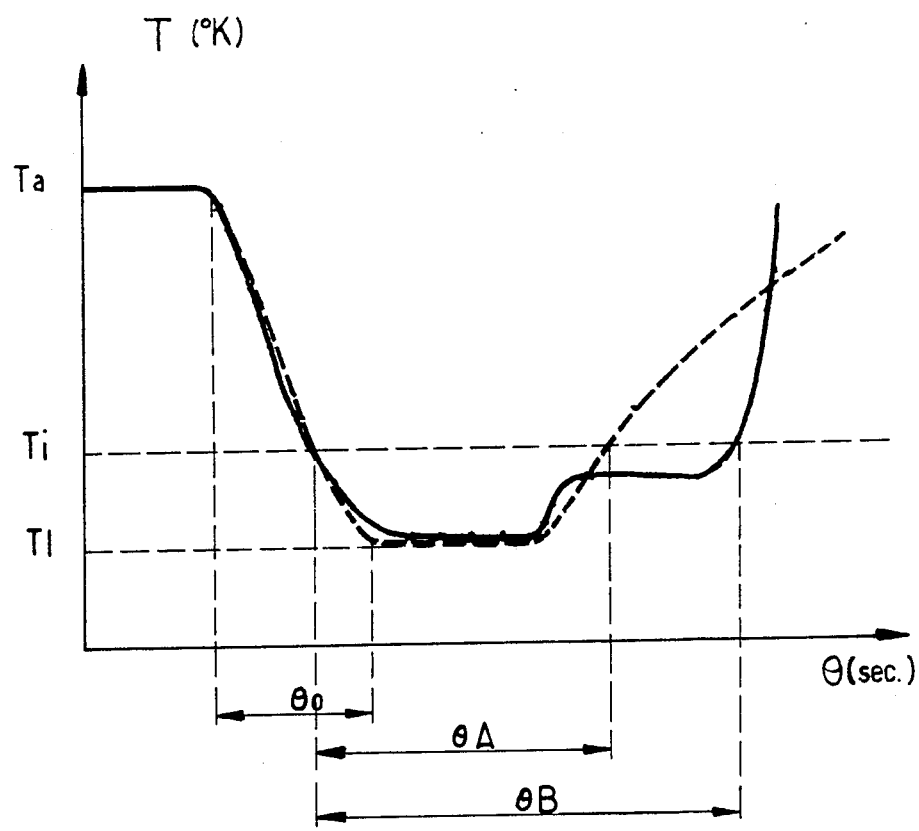
FIG. 3 is a diagram of the evolution, during the time $\theta$, of the temperature T of the device of FIG. 1, shown with a continuous line, compared with that of a prior art system shown with a broken line.

After the refrigerant supply has been cut off or exhausted, the latent sublimation heat of the condensed gas is recovered and contributes to maintain the temperature of cold finger 1 during the phase change time. In fact, referring to FIG. 3, for the cryogenic system of the invention (continuous line), as for a conventional vacuum system of the prior art (broken line), the evolution of the temperature T during the refrigeration time $\theta o$ is similar and the curve is substantially linear from the ambient temperature Ta to the intermediate temperature Ti, then rapidly bends to reach the liquefaction temperature T1 of the refrigerating fluid, during the phase changes of the gas contained in enclosure 6.

When cooling of finger 1 ceases, in the conventional device, the temperature increases substantially linearly in time. The time of self-supporting operation θA corresponds to the duration of use of the photodetector. In the device of the invention, the temperature shows a second level portion corresponding to the latent sublimation heat of the gas filling enclosure 6. This results in artificially increasing the heat capacity of the cryogenic system of the invention and consequently in increasing the time of self-supporting operation θB of the detector as shown in the Figure.

Figure 4:
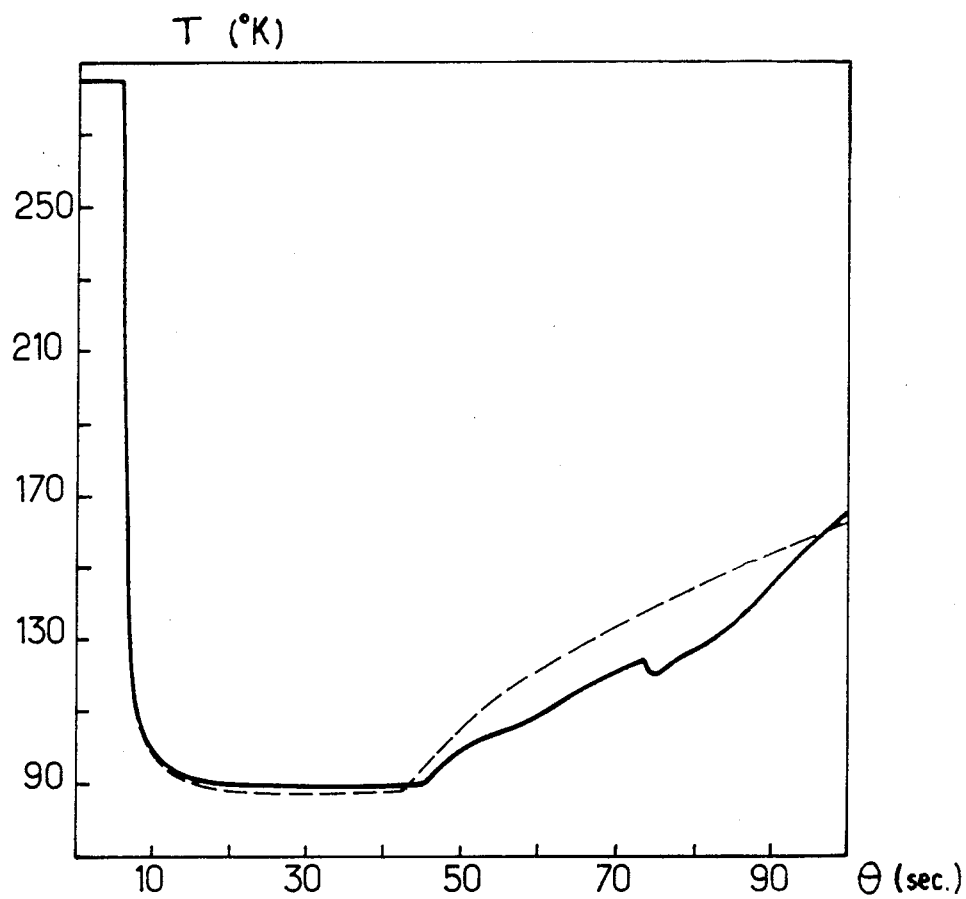
FIG. 4 shows experimental recordings of the evolution, during the time $\theta$ of the temperature T of the system in accordance with the invention, shown with a continuous line, and of a prior art device shown with a broken line.

FIG. 4 shows experimental results which confirm these predications, in the case where the intermediate temperature is 120° K. for example.

The time of self-supporting operation of the system of the invention may be essentially increased depending on the gas used. This gas may be xenon, krypton, argon, nitrogen, carbon dioxide, nitrogen protoxide or, also, a mixture of these gases, under suitably chosen partial pressures.

Since it is no longer necessary to have a double wall under a sealed vacuum, the mechanical structure of the enclosure may be simpler and lighter. The seals and the electric connections for the photodetectors may be designed more easily. The system of the invention also allows more reliable storage.

It is of course, possible, without departing from the spirit of the invention, to use the vaporization heat of the gas depending on the gas mixture chosen. It is sufficient to choose a mixture such that the temperature T1 corresponds to a liquid-vapor instead of solid-vapor balance.

The system of the invention may be modified so as to recover at the outlet of finger 1, at least a part of the refrigerating fluid used for the refrigerant supply of this finger 1 and to channel the resulting cold gas into a jacket 10 (shown in phantom lines) fixed to the wall 4 by way of channel 12 (also shown in phantom lines).

Such thermalization of wall 4 of the cryogenic system on the one hand reduces the temperature difference between the outside and the inside of the system, thus reducing the heat losses and increasing correspondingly the time of self-supporting operation and, on the other hand, ensures possible demisting of window 7.

The cryogenic system of the invention has very numerous other advantages such as the suppression of getters for maintaining the vacuum; it finally allows different organic products to be used inside the cryogenic device (epoxy adhesives, organic blacks, . . . ) which are better performing but perhaps more degasifying and thus unusable in a vacuum.

What is claimed is:

1. A cryogenic device for radiation detector comprising:
   a finger cooled to a low temperature and adapted for supporting and cooling said detector,
   a wall surrounding said finger having, opposite said detector, a window transparent to the radiation to be detected
and in which the enclosure defined by said finger and said wall is closed and filled with at least a gas, said gas, as well as its pressure in the enclosure, being chosen so that said gas has a low thermal conductivity and so that its liquefaction or solidification temperature is higher than that reached by said finger.

2. The device as claimed in claim 1, wherein said gas is chosen from the following: xenon, krypton, argon, nitrogen, carbon dioxide, nitrogen protoxide and a mixture of these gases.

3. The device as claimed in any one of claims 1 and 2 including a cooling jacket surrounding said wall, and wherein a refrigerating fluid is used to a cool said finger and wherein said finger defines an outlet for the passage of refrigerating fluid to the cooling jacket.

* * * * *